United States Patent [19]

Karaki

[11] Patent Number: 4,530,098
[45] Date of Patent: Jul. 16, 1985

[54] DEVICE FOR VARYING LASER OUTPUT

[75] Inventor: Kouichi Karaki, Tokyo, Japan

[73] Assignee: Olympus Optical Company Limited, Tokyo, Japan

[21] Appl. No.: 443,897

[22] Filed: Nov. 23, 1982

[30] Foreign Application Priority Data

Nov. 24, 1981 [JP] Japan .................................. 56-187959

[51] Int. Cl.³ ................................................ H01S 3/10
[52] U.S. Cl. .......................................... 372/9; 372/34; 372/108
[58] Field of Search ................... 372/99, 105, 106, 65, 372/61, 33, 34, 9, 107, 108; 373/15

[56] References Cited

U.S. PATENT DOCUMENTS 3,900,804  8/1975  Davis et al. .......................... 372/34

Primary Examiner—William L. Sikes
Assistant Examiner—Léon Scott, Jr.
Attorney, Agent, or Firm—Toren, McGeady, Stanger, Goldberg & Kiel

[57] ABSTRACT

A device for varying laser output including a source for generating a laser beam, at least one parallel flat plate having a transmissive characteristic for the laser beam and so arranged that the laser beam enters with the optical axis thereof at a Brewster's angle, a mechanism for rotating the plate about the optical axis, and a laser absorbing body for absorbing the laser beam reflected from the plate.

5 Claims, 8 Drawing Figures

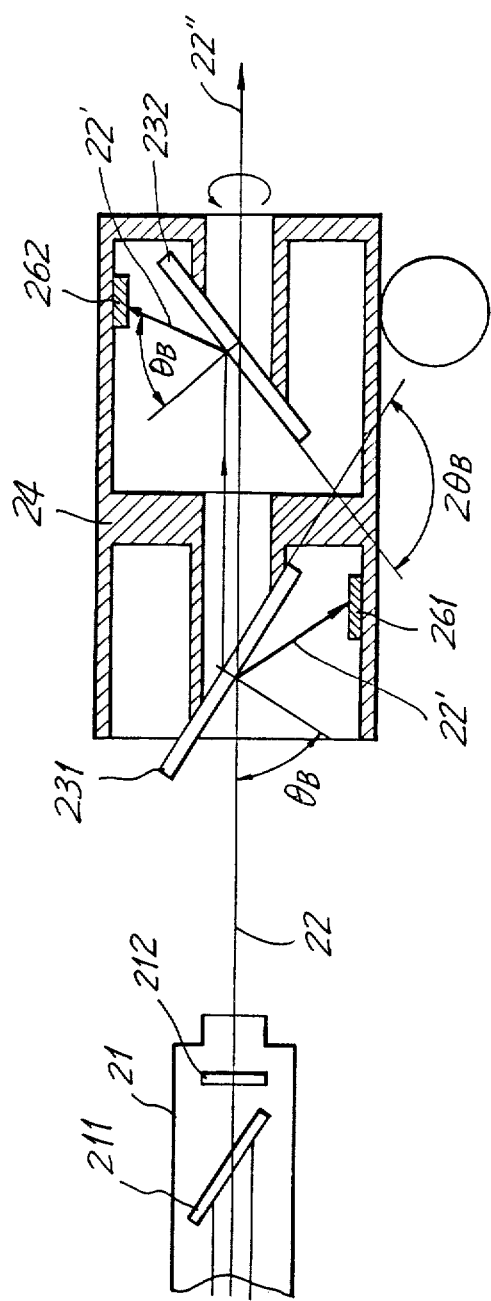

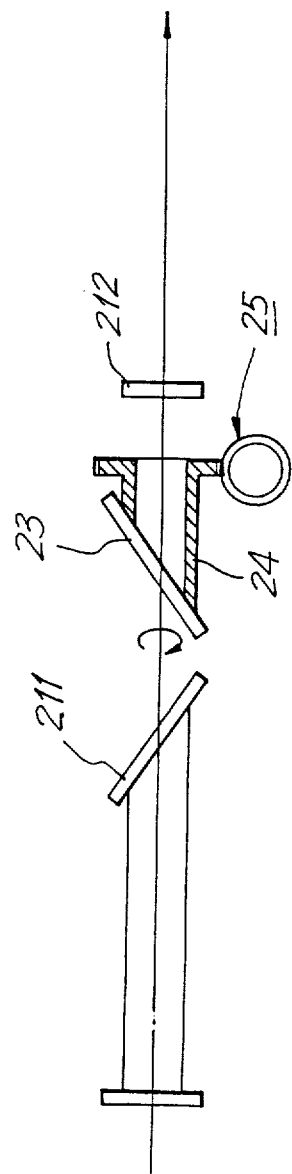

DEVICE FOR VARYING LASER OUTPUT

BACKGROUND OF THE INVENTION

The present invention relates to a laser output changing device capable of changing laser output with stability.

Recently, a laser is widely utilized in various fields.

In fields of medical and small scale machining application, there is used $CO_2$ gas laser having an output of several tens of Watt or so as a typical laser. In such a gas laser it is necessary to change or vary the output derived from its oscillator according to usage.

Such a $CO_2$ gas laser is used to oscillate with the excitation by glow discharge in low pressure mixed gas of several tens of torr or so, so that the output of the laser oscillator is made variable by changing the amount of discharge current. Such a changing means, however, has following disadvantages.

(a) Current control circuit of high voltage (few Kv to several tens of Kv) is required to control discharge current so that circuit elements for performing current control at such a high voltage become large in size and expensive.

(b) In the low pressure gas laser for discharge excitation such as $CO_2$ gas laser the safety oscillating region of the laser is not always positioned at the discharge stabilizing region so that the change of discharge current causes lack of stabilization of discharge and thus laser oscillation. Therefore, it is desirable to fix the discharge current and voltage at most suitable value.

(c) Because of the reason of the above disadvantage (b) even by the control of discharge current the output of the laser can be changed with stability only at low output region being 30% or so of maximum output of the laser.

(d) Current control elements become a factor which determines durability of the device.

While the CW oscillation of high output laser having output higher than that of the above described laser, such as CO, HF, DF, or the like has the same problem so that the output of the high output laser must be changed according to application. In this case, however, suitable means for changing output of the laser has not been developed.

SUMMARY OF THE INVENTION

It is an object of the present invention to overcome the above described disadvantages of conventional laser output changing device.

It is another object of the present invention to provide a device for varying laser output which is capable of stably changing laser output with simple construction and operation.

According to the present invention there is provided a device for varying laser output comprising a source generating laser beam, at least one parallel flat plate having a transmissive characteristic for laser beam and so arranged that the laser beam enters on an optical axis thereof with a Brewster's angle, means for rotating the plate about the optical axis, and a laser absorbing body for absorbing the laser beam reflected from the plate.

The means for rotating the parallel flat plate detects temperature increase of the laser absorbing body, arithmetically operates laser output passing through the plate, and rotates the plate by an output caused by comparing the operated result with a preset output of the device. The laser absorbing body has a cooling means.

The parallel flat plate, the plate rotating means and the laser absorbing body are accommodated in a laser resonator.

BRIEF DESCRIPTION OF THE DRAWING

These and other feature and advantages of the present invention will become readily apparent from the following detailed description of one embodiment of the present invention, particularly when taken in connection with the accompanying drawings wherein like reference numerals designate like or functionaly equivalent parts throughout, and wherein;

FIG. 6 is a partly sectional fragmentary schematic view showing a construction of fourth embodiment of the device according to the present invention; and FIG. 7 is a partly sectional fragmentary schematic view showing a construction of fifth embodiment of the device according to the present invention.

DESCRIPTION OF THE PREFERRED EMBODIMENT

Figure 1:
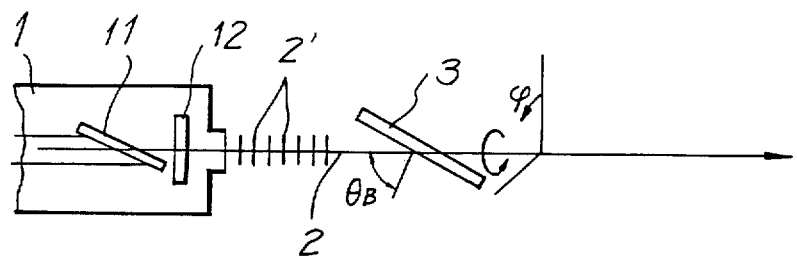
FIG. 1 is a schematic illustration showing a principle of a device for changing laser output according to the present invention.

Refering now to the drawing, there is shown an embodiment of a device for varying laser output according to the present invention.

FIG. 1 shows a principle of the present invention. In FIG. 1 reference numeral 1 is a $CO_2$ gas laser oscillator or resonator having a Brewster angle window 11 and a mirror 12 for deriving output of the laser. The oscillator 1 generates a single linearly polarized laser beam 2. In this case polarized components 2' of the oscillated laser beam are linearly polarized light having only parallel components.

A parallel flat plate 3 having a characteristic passing through the laser beam such as Ge, ZnSe is provided on an optical axis of the laser beam 2 generated from the oscillator 1. The parallel flat plate 3 is so arranged that the laser beam 2 is incident on the plate 3 at Brewster's angle $\theta_B$ to the oscillating wave length.

With such an arrangement an transmission factor of the laser beam 2 to the parallel flat plate 3 is 100% due to Brewster's Law. That is, the laser beam 2 is incident on the plate 3 under 100% of P polarized condition. When under this condition the parallel flat plate 3 is rotated about the optical axis of the laser beam 2 to rotate incident surface of the laser beam 2 to the parallel flat plate 3 (in this case the turning angle is $\phi$), P components of the laser beam 2 to the parallel flat plate 3 are decreased and S components thereof are increased so that S components become 100% at $\phi=90°$ and thus the transmission factor of the laser beam 2 becomes minimum at this point.

The energy transmission factor for the parallel flat plate 3 could be expressed as follows based on Fresnel's formulas.

$$T = \cos^2\phi + \frac{\sin 2\theta_B \sin 2(\theta_B - \pi/2)}{\sin^2 \pi/2} \times \sin^2\phi$$

wherein $\theta_B = \tan^{-1} n$ (n is refractive index of the parallel flat plate 3).

Figure 2:
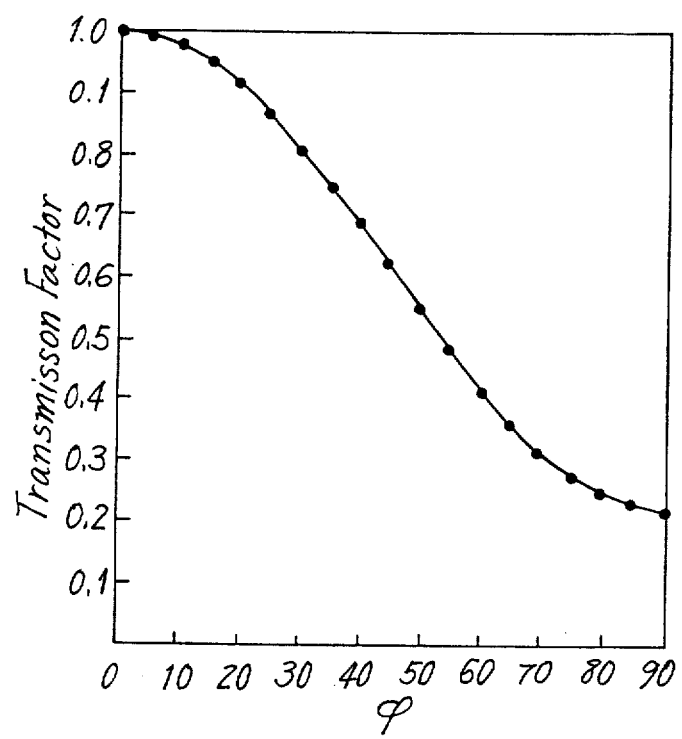
FIG. 2 is a diagrammatic view explaining the principle of the device shown in FIG. 1.

Thus, the transmission factor can be changed by rotating the incident surface of the laser beam 2 to the parallel flat plate 3 by the turning angle $\phi$, thereby changing the amount of beam passing through the parallel flat plate 3. For example, provided that use is made of $CO_2$ laser generating wave length of 10.6 μm and Ge(n=4) plate as the parallel flat plate 3. In this case if the turning angle $\phi$ of the parallel flat plate 3 is changed from 0° to 90° transmission factor of the parallel flat plate 3 can be changed from 100% to 22% as shown in FIG. 2.

In this case, the wave length of $CO_2$ gas laser is positioned in an infrared region so that the refractive index of translucent member such as the parallel flat plate 3 in the infrared region is higher than that in a visible region and thus the transmission factor at $\phi=90°$ (S polarized input) is considerably decreased.

Next, one embodiment of a device for changing laser output according to the present invention based on such a principle is explained with reference to FIGS. 3a and 3b.

Figure 3A:
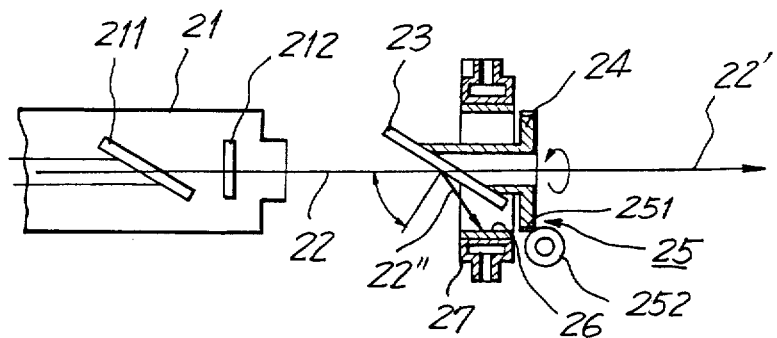
FIG. 3a is a partly sectional fragmentary schematic view showing a construction of first embodiment of the device according to the present invention.
Figure 3B:
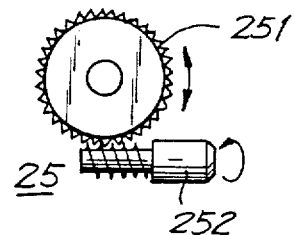
FIG. 3b is a side view showing a rotating drive mechanism of the device according to the present invention.

In FIG. 3a reference numeral 21 is an oscillator of $CO_2$ gas laser having a Brewster angle window 211 and a mirror 212 for deriving output of the laser. The oscillator 21 generates a laser beam 22. A translucent member, for example a parallel flat plate 23 of Ge, ZnSe and having a characteristic passing through the laser beam is provided on an optical axis of the laser beam 22. The parallel flat plate 23 is supported on a holder 24 with an inclination in such a manner that the laser beam 22 is incident at Brewster's angle $\theta_b$.

The holder 24 is formed in a cylindrical shape, on one opening end of which the parallel flat plate 23 is supported and to another opening end of which a rotating drive mechanism 25 is provided. The drive mechanism 25 rotates the holder 24 about an optical axis, resulting in a rotation of the parallel flat plate 23 about the optical axis. As shown in FIG. 3b the drive mechanism 25 comprises a worm wheel 251 provided to the holder 24 and a worm 252 which is meshed with the worm wheel 251.

A laser absorbing body 26 such as brick is provided along the periphery of the holder 24. The absorbing body 26 absorbs laser beam reflected by the parallel flat plate 23. The absorbing body 26 is provided with a cooling means such as water jacket 27 thereby eliminating heat generated in the body 26. Cooling water is supplied to the jacket 27.

The function of the device according to the present invention is explained hereinafter.

The laser beam 22 generated by the laser oscillator 21 is incident on the surface of the parallel flat plate 23. If the turning angle $\phi$ of the incident surface of the laser beam 22 to the parallel flat plate 23 is 0° the transmission factor of the parallel flat plate 23 becomes 100% so that the laser beam 22' passing through the parallel flat plate 23 with transmission factor of 100% can be obtained.

If the drive mechanism 25 rotates the holder 24 and thus the parallel flat plate 23 about the optical axis, that is, the turning angle $\phi$ is changed within the range of 0° to 90°, the transmission factor of the plate 23 is changed so that the transmitted laser beam 22' can be obtained in accordance with the transmission factor in this connection and the reflected laser beam 22" is absorbed in the absorbing body 26. If $CO_2$ gas laser having output of 100 W is used the reflected laser beam becomes 80 W at 100 =90° while the absorbing body 26 is constructed by a block having excellent heat-resisting property and the cooling water is supplied to the water jacket 27 so that the generated heat can positively be eliminated.

As described above, the laser output can optionally be changed by rotating the holder 24 and the parallel flat plate 23 by the drive mechanism 25. When Ge (n=4.0) is used as the plate 23 the laser output can be changed within a range of 100% to 22% of transmission factor.

According to such a construction, the parallel flat plate having a characteristic passing through the laser beam is so arranged that the laser beam is incident on the optical axis of the beam at Brewster's angle and the plate is rotated about the optical axis so that the laser output can be changed thereby obtaining the device with simple construction and simple function.

The turning angle of the parallel flat plate is 90°, but even this angle is increased the output of laser is changed only in the variable region so that the stopper mechanism can be omitted resulting in a simplification of construction. Moreover, the output regulation of comparatively wide angle results in a fine regulation of output and a high mechanical precision.

The change of laser output is performed independently of laser oscillator so that the oscillator can be used with stability and best condition (current and gas pressure in the case of gas laser). This omits current stabilized control circuit in the supply source of the laser oscillator so that a small and inexpensive oscillator can be obtained.

Figure 4:
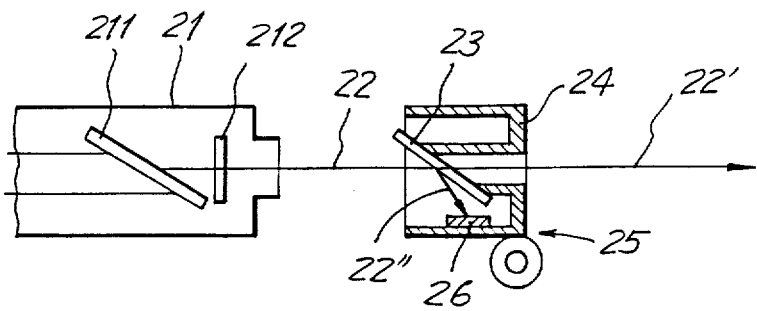
FIG. 4 is a partly sectional fragmentary schematic view showing a construction of second embodiment of the device according to the present invention.

FIG. 4 shows another embodiment of the device according to the present invention. In this embodiment the laser beam absorbing body 26 is fixed to the holder 24 thereby rotating with the holder 24 about the optical axis. The other constructions are quite same as that of above mentioned device.

According to such construction size of the absorbing body 26 may be made small in such a manner that the spot of the reflected laser beam 22' is incident on the body 26.

Figure 5:
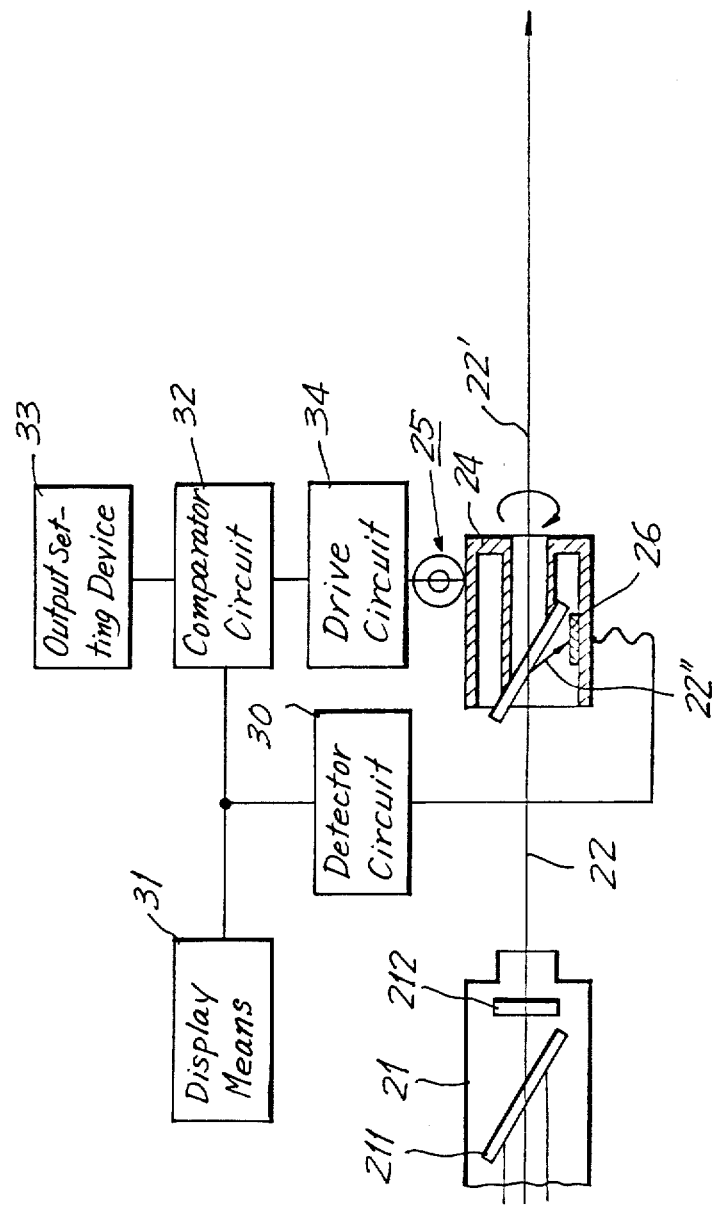
FIG. 5 is a partly sectional fragmentary schematic view showing a construction of third embodiment of the device according to the present invention.

FIG. 5 shows other embodiment of the device according to the present invention. In this embodiment laser output can be automatically regulated to the set value. To this end, the laser beam absorbing body 26 has temperature detecting function, temperature increase of the body 26 caused by the reflected laser beam 22' from the parallel flat plate 23 is detected by a detector circuit 30, the output of the laser beam 22' passing through the plate 23 is arithmetically operated based on the detected temperature, and the operated output is displayed by a display means or unit 31. At the same time the output of the detector circuit 30 is supplied to a comparator circuit 32 which compares it with the output of an output setting unit 33 which set the laser output to predetermined value. The compared output of the comparator 32 is supplied to the rotating device mechanism 25 through a drive circuit 34. The drive mechanism 25 drives the holder 24 thereby adjusting laser beam 22' passing through the plate 23 to the set value.

According to such construction the laser output can be automatically adjusted to the desired set value resulting in a simple operation.

FIG. 6 is other embodiment of the device according to the present invention. In this embodiment the output variable region can be made wide. In this case a plurality of parallel flat plate 231, 232 (in this embodiment, two plates) are so arrenged that laser beam 22 is incident on the optical axis thereof at Brewster's angle $\theta_B$. These parallel flat plate 231, 232 are provided to the common holder 24 and rotated about the optical axis by the rotating drive mechanism 24. Reference numeral 261, 262 are absorbing body for absorbing laser beam reflected by each parallel flat plate 231, 232.

According to such construction the transmission factor can be changed by each plate 231, 232 so that variable region of laser output can be made wide. For example, provided that use is made of parallel flat plates 231, 232 of Ge (n=4.0). In this case the output variable region can be made wide to the region of 4% to 100%. If ZnSe (n=2.4) is used as the parallel flat plate 231, 232 the output region can be made wide to the region of 12% to 100%. The use of two parallel flat plates 231, 232 results in a correction of optical axis deviation and a suitable laser beam output.

FIG. 7 shows other embodiment of the device according to the present invention. In this above embodiments the device is independently provided at the outside of the laser oscillator, but the device may be provided at the inside of the laser resonator. In this embodiment the same device as in FIG. 3 is incorporated between a Brewster angle window 211 and a mirror 212 for deriving laser output of the resonator.

According to such construction the rotation of the holder 21 changes loss of the resonator resulting in an adjustment of oscillated output.

The present invention is not limited to the above described embodiments, but various modifications and alternations are possible.

What is claimed is:

1. A device for varying laser output comprising: a source for generating a laser beam having an optical axis; at least one laser-transmissive parallel flat plate arranged on said optical axis such that said laser beam is made incident relative thereto with said optical axis of said laser beam at a Brewster's angle relative to said plate, said flat plate being rotatable about said optical axis of said laser beam as the rotational center thereof so that rotation of an incident plane with respect to said laser beam causes the transmissivity of said laser beam to vary; means for rotatively driving said parallel flat plate; and a laser absorbing body for absorbing said laser beam which is reflected from said parallel flat plate; said parallel flat plate driving means comprises temperature detection means for detecting a temperature rise in said laser absorbing body; means for setting a predetermined laser output; and means for comparing an output of said temperature detection means with an output of said laser output setting means.

2. A device for varying laser output according to claim 1, wherein said parallel flat plate driving means relatively drives said parallel flat plate in accordance with an output of said comparing means.

3. A device for varying laser output according to claim 1 or 2, further comprising: means for removing generated heat due to laser absorption arranged around said laser absorbing body.

4. A device for varying laser output according to claims 1 or 2, including an extracting mirror wherein said laser beam generating source comprises a Brewster's window, and wherein said parallel flat plate, said parallel flat plate driving means and said laser absorbing means are disposed between said Brewster's window and said extracting mirror.

5. A device for varying laser output according to claim 1 or 2, wherein a plurality of said parallel flat plates are arranged so that said laser beam is made incident thereto with the optical axis of said laser beam at a Brewster's angle, and said plurality of said parallel flat plates are integrally rotated together about the optical axis of said laser beam as a rotational axis.

* * * * *